United States Patent Office 2,694,355
Patented Nov. 16, 1954

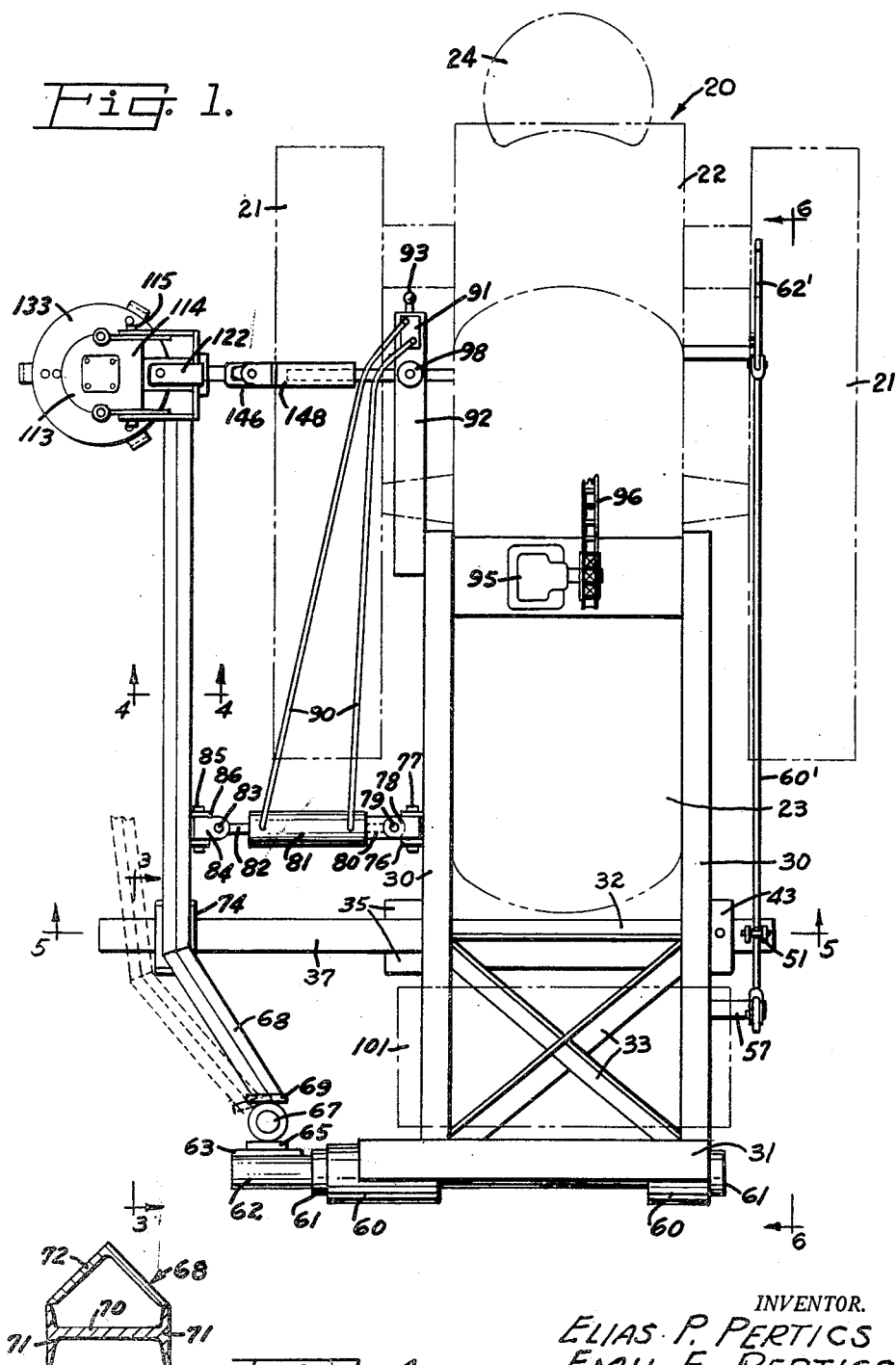

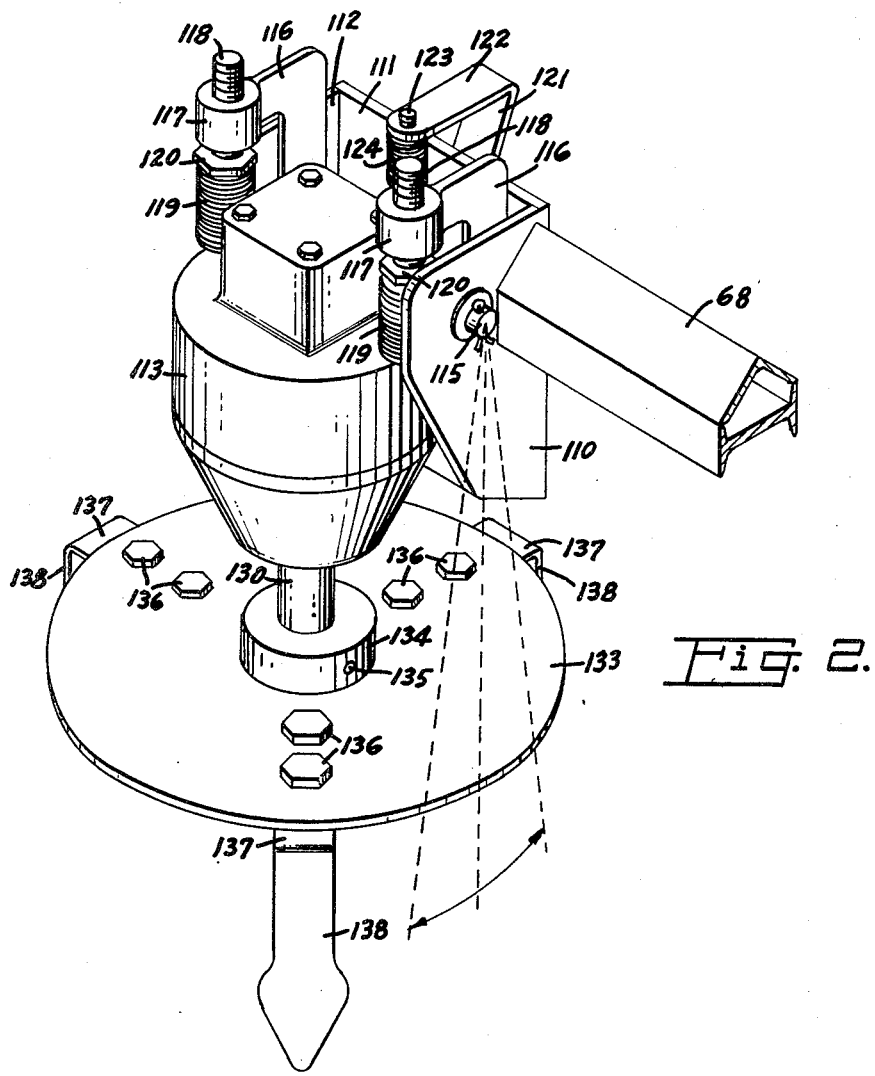
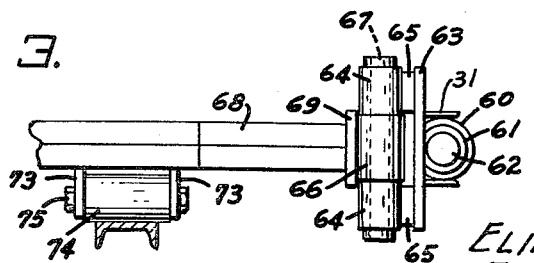

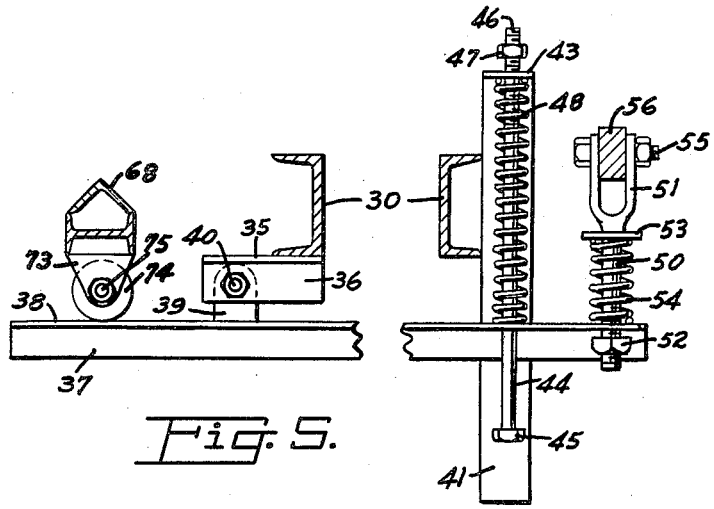
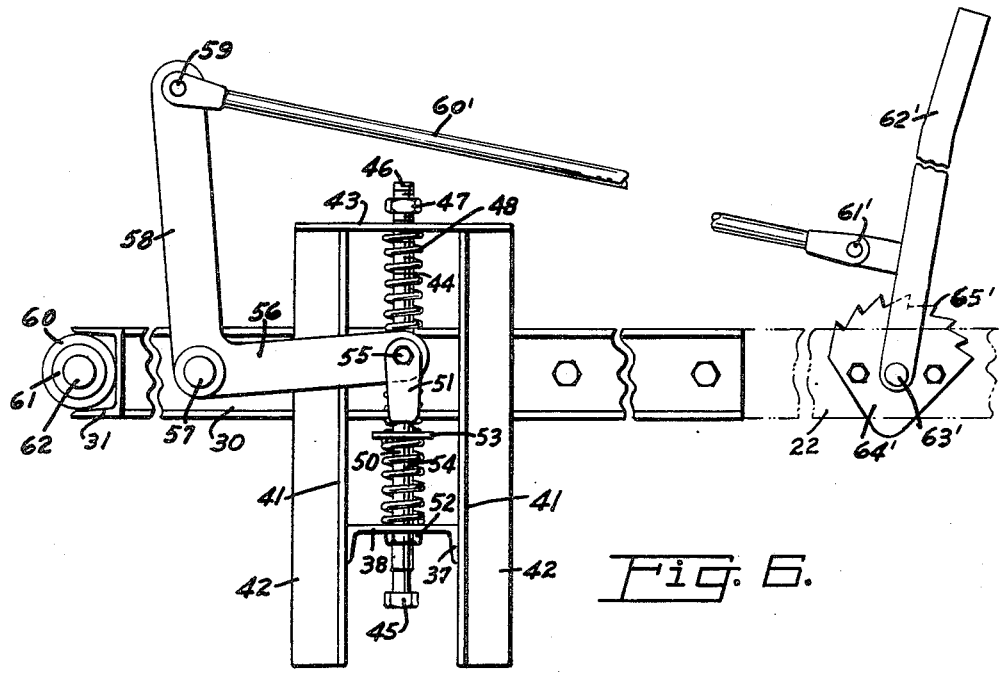

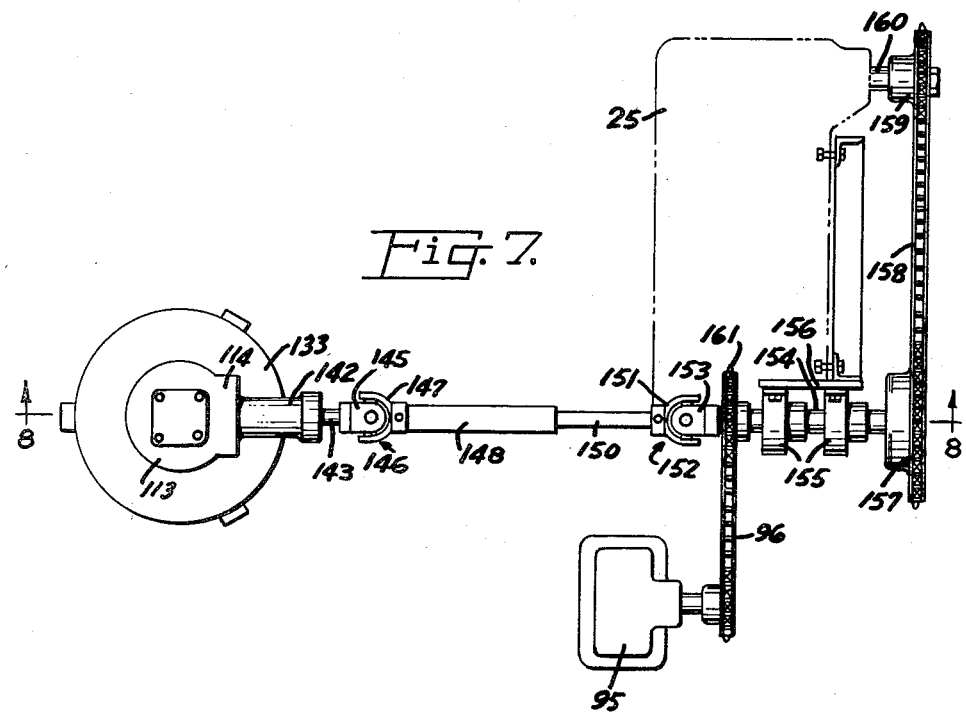

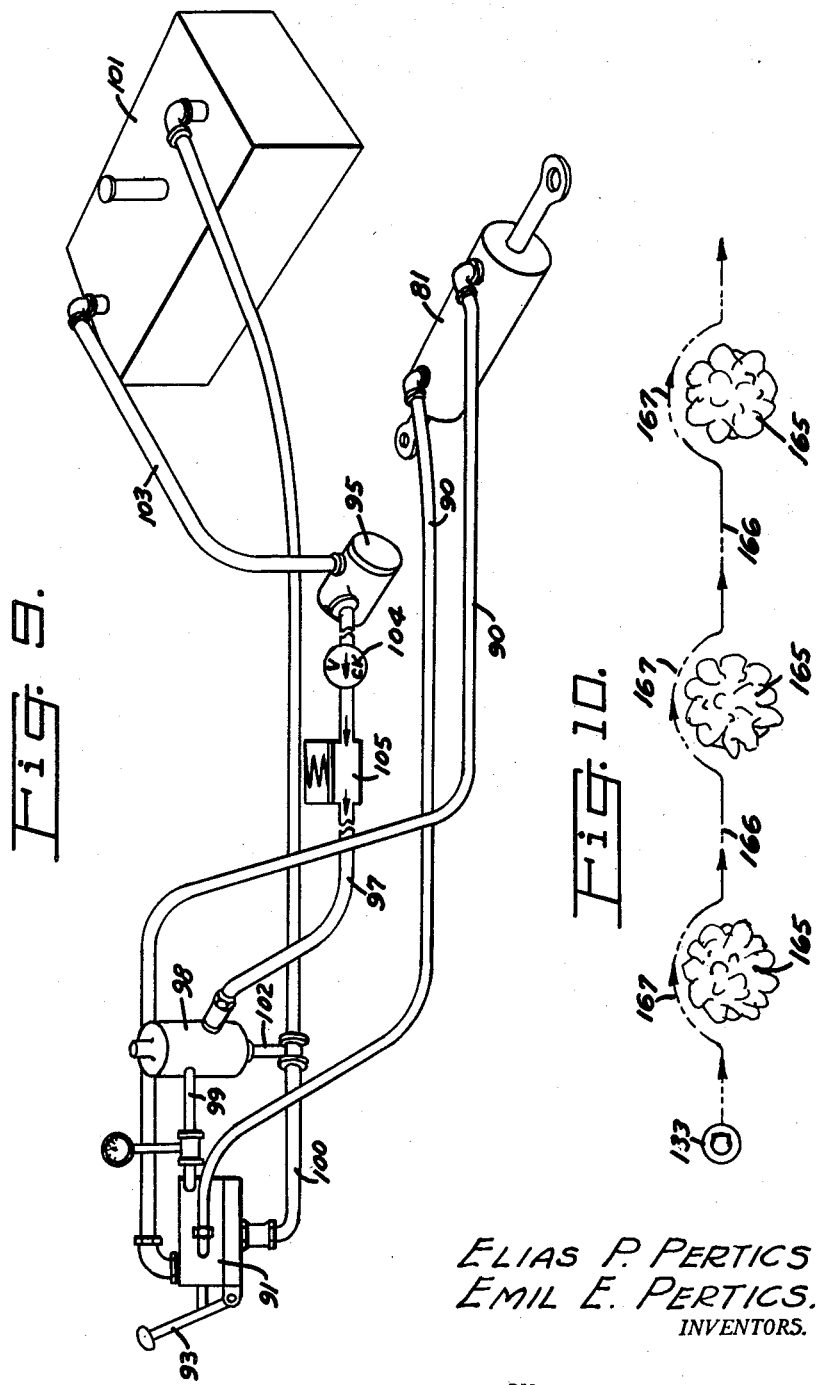

2,694,355

LATERALLY SHIFTABLE TRACTOR-MOUNTED CULTIVATOR

Elias P. Pertics and Emil E. Pertics, North Township, Marshall County, Ind.

Application July 17, 1950, Serial No. 174,214

3 Claims. (Cl. 97—137)

This invention relates to a laterally shiftable tractor-mounted cultivator, and particularly to a cultivator by means of which the soil may be cultivated around and between plants positioned in rows.

Various types of cultivators have been provided heretofore, adapted to be mounted upon tractors or other power driven mechanism, for the purpose of cultivating row crops. Such cultivators usually fall into one of two specific categories, the first of which employs shovel-like members mounted in predetermined relation to a tractor for breaking up the earth when drawn between rows as determined by the path of travel of the tractor. These shovel-like elements usually move only in a straight line and pass along opposite sides of the plants in the row, such as corn, and any movement that the cultivator elements possess is commonly limited to movement in a vertical plane to enable the cultivator to shift its position when it encounters an obstacle, such as a stone, rock, or the like. The operation of this type of cultivator, therefore, is quite similar to the operation of a plow insofar as the action of breaking up or loosening the earth is concerned.

Another type of cultivator is the type known as a rotary tiller, wherein the ground-working member or tool rotates about a horizontal axis positioned transverse of the direction or path of movement of the implement and is power driven. Such implements may either be mounted upon a tractor to be propelled and driven thereby or may constitute tools which are mounted upon wheels and adapted to be controlled or operated by a man on foot. This type of cultivator is limited in its operation to movement in a straight line and is substantially incapable of movement from side to side.

In many types of farming where plants are positioned in rows and are spaced apart substantial distances in those rows, it is necessary to cultivate around the plants and between the plants in each row in order to secure favorable growing conditions. Instances which can be cited as illustrative of these conditions are grape vines and blueberry plants. In neither of these instances is cross-cultivation feasible. Straight cultivation with cultivators of either of the types mentioned above can occur in the space between rows and usually cannot be accomplished very close to the plants in the rows. The result has been a necessity for cultivation of the plants by hand. This hand cultivation is laborious, time-consuming and expensive. It is particularly laborious and difficult in instances where plants, such as blueberries which require a high water table with consequent heavy and moist earth, are to be cultivated.

It is the primary object of this invention to provide a device by means of which a cultivating tool can be moved from side to side so as to control its lateral position with respect to a tractor and to permit it to cultivate the ground between plants in a row and to shift to pass clear of the plants as the implement is moved lengthwise along the row.

A further object is to provide a cultivator having an earth-working head rotating about an upright axis and mounted upon a tractive vehicle in a manner for selective adjusted lateral position with reference to the vehicle.

A further object is to provide a cultivator having a rotating tool operating on an upright axis and adjustable both as to its lateral position with respect to a tractive member and with respect to depth of soil penetration.

A further object is to provide a cultivator having a rotating power driven ground-working tool provided with means for tilting that tool to selected working position.

A further object is to provide a cultivator having a rotary ground-working tool which is carried by a member shiftable laterally on a cultivator and traversing an adjustable guide, wherein said tool has a continuous driving connection with the driving member of the tractor.

Other objects will be apparent from the following specification.

In the drawing:

Fig. 1 is a top plan view of the device mounted upon a tractor illustrated in dotted lines.

Fig. 2 is a perspective view of the ground-working tool element.

Fig. 3 is a fragmentary sectional view taken on line 3—3 of Fig. 1.

Fig. 4 is a detail sectional view taken on line 4—4 of Fig. 1.

Fig. 5 is a fragmentary transverse sectional view taken on line 5—5 of Fig. 1.

Fig. 6 is a fragmentary side view of the device as viewed on line 6—6 of Fig. 1.

Fig. 7 is a top view illustrating the driving connection between the driving mechanism and the cultivator head.

Fig. 8 is a longitudinal sectional view taken on line 8—8 of Fig. 7.

Fig. 9 is a perspective view illustrating the hydraulic system of the device; and Fig. 10 is a schematic view illustrating the manner in which the device is used.

Referring to the drawings which illustrate the preferred embodiment of the invention, the numeral 20 designates a tractor, here shown as of the crawler type traveling on endless track members 21 and having the usual frame 22 and engine 23. My cultivating device is mounted upon the tractor 20 or upon any wheeled or mobile vehicle by means of a rigid frame which includes the longitudinal frame members 30 secured to the tractor frame at opposite sides thereof and projecting forwardly beyond the tractor. The frame members 30 may be secured to the tractor frame in any suitable manner. The frame members 30 have welded or otherwise rigidly secured thereto at their forward end a transverse rigid frame member 31, here illustrated as a channel member. One or more additional transverse frame members, such as the member 32, may connect the forwardly projecting portions of the frame members 30 and, if desired, additional members, such as the diagonally positioned intersecting angle irons 33, may also interconnect the longitudinal frame members 30 between the members 31 and 32 to further rigidify the forwardly projecting frame. One of the frame members 30, here illustrated as the left-hand frame member in Figs. 1 and 5, has secured thereto in depending relation, as by welding or other securing means, a bracket 35 having positioned substantially upright or vertical a web or flange 36 which extends transversely with respect to the frame member 30. An elongated rigid channel member 37, preferably positioned with its central portion 38 uppermost and its side flanges in downwardly projecting relation therefrom, extends transversely of the frame. The channel 37 will preferably be provided with one or more upwardly projecting brackets 39 intermediate its ends which are pivoted at 40 to the depending flange 36 of the bracket 35. The channel 37 passes slidably between the upright inner guide flanges 41 of a pair of spaced vertical rigid guide members 42, here shown as angle irons. The upright guide members 42 are fixedly secured to the frame member 30 opposite that to which the channel 37 is pivoted, here illustrated in Figs. 1 and 5 as the right-hand frame member 30. Any suitable means, such as welding, may be utilized to fix the guides 42 to said frame member 30. A rigid cross member 43 is fixedly secured to and connects the guide members 42. An elongated shaft 44, here illustrated as a bolt having an enlarged head 45 at its lower end and a threaded shank portion 46 at its upper end, is positioned between the top members 42, passing through an aperture in the top member 43 and an aperture in the channel member 37. A nut 47 is carried by the threaded shank portion 46. A coil spring 48 encircles the bolt shank 46 and bears at its lower end upon the back 38 of the channel 37 and at its upper end against the bottom surface of the cross plate 43.

In outwardly spaced relation to the guide 42 and the frame member 30 carrying said guide, the channel 37 has connected thereto the shank portion 50 of a bifurcated substantially upright yoke member 51. The shank is preferably screw-threaded and extends through an aperture in the back 38 of the channel 37, and a nut 52 threaded on the shank is adapted to bear against the bottom surface of the channel back 38. A washer 53 is fixedly secured to the shank of the yoke as by welding, and a coil spring 54 encircles the yoke shank, bearing at its upper end against the washer 53 and at its lower end against the upper surface of the channel back 38. The yoke is pivotally connected by connector 55 to the free end of one arm 56 of a bellcrank lever. This bellcrank lever is pivoted upon stud shaft 57 projecting laterally outward from the adjacent frame member 30, preferably forwardly of the cross channel 37. The other arm 58 of the bellcrank lever preferably extends upwardly and has pivotally connected thereto at 59 one end of an elongated link or rod 60'. The other end of the rod 60' is pivotally connected at 61' to a hand lever 62' which is pivoted at 63' to a sector member 64' carried by the tractor frame 22 rearwardly of the cross channel 37 and preferably within reach of an operator of the tractor sitting upon the tractor seat 24. Ratchet means (not shown) are mounted upon the lever 62' and adapted for engagement with the teeth 65' upon the periphery of the segment 64' so as to hold the lever 62' and its associated parts in selected position. It will be apparent that as the lever 62' is shifted from one position to another, the arm 56 of the bellcrank lever is swung to raise or lower its pivot connection 55 with the yoke 50, 51. As these parts are raised or lowered, the end of the cross channel 37, 38 connected thereto is similarly raised or lowered, this action thus serving either to compress or permit expansion of the coil spring 48. The coil springs 48 and 54 provide yielding connections between the parts for purposes to be mentioned hereinafter.

Bearing members 60 are fixedly secured to the front frame cross member 31 as by welding thereof, said bearings preferably comprising sleeves which rotatably receive collars 61 carried by a cross shaft 62. The cross shaft 62 projects from one side of the frame, here shown as the right side in Fig. 1, and is adapted to rotate about its longitudinal axis, i. e., about an axis transverse of the longitudinal frame members 30 of the device. A vertically elongated rigid plate 63 is welded or otherwise fixedly secured to the laterally projecting end of the shaft 62, as best seen in Fig. 3. A pair of vertically spaced axially aligned bearing members 64 are anchored to the plate 63 as by means of plate 65 welded or otherwise connected to the plate 63. A bearing member 66 is positioned between the bearings 64 in axial alignment therewith. A pin or shaft 67 extends axially through the bearings 64 and 66 and preferably is headed at its ends to hold the parts in assembled relation. The bearing 66 is mounted upon the front end of an elongated rigid arm 68 as by means of a cross plate 69 welded or otherwise secured to the bearing and in turn fixedly secured to the arm 68. The arm 68 constitutes a carrier member for a tool unit and must be strong and rigid and adapted to withstand both bending and twisting forces. Any construction of arm which will satisfy these conditions may be employed. For purposes of illustration, the arm has been shown in Fig. 4 as having a beam of H-shape including a central web 70 and perpendicular flanges 71 to which are welded along their length the opposite marginal portions of an angle iron 72. The resultant member is of a cross-section somewhat resembling the letter A, as seen in Fig. 4, and possesses great strength and resilience to bending and to twisting.

The arm 68 has a pair of brackets 73 welded or otherwise fixedly secured thereto spaced from the bearing 66. Between these brackets 73 is mounted anti-friction means such as a roller 74 journaled upon an axis 75 by a shaft or pin carried by the brackets 73. The roller 74 is of a length greater than the width of the back 38 of the channel 37 and is so positioned along the length of the arm 68 as to bear upon the channel 37 and to run thereon as a lateral guide.

In rearwardly spaced relation to the bracket 35 the right-hand longitudinal frame member 30 viewed in Fig. 1 has secured thereto a yoke or bracket 76 to which is pivoted upon a pin 77 substantially parallel to the frame member 30 a clevis 78, in turn having pivotally connected thereto at 79 a projecting ear 80 mounted upon the end of a cylinder 81. The cylinder 81 is preferably of the type having a double-acting piston (not shown) provided with a piston rod 82 projecting from the opposite end of the cylinder adapted for pivotal connection at 83 with a clevis 84. The clevis 84 is pivoted by means of a pin or shaft 85 to a clevis or bracket 86 which is fixedly secured to the arm 68 rearwardly of the roller 74.

Conduits 90 connect the opposite ends of the cylinder 81 to a control valve 91 which is mounted upon a support 92 projecting rearwardly from the frame 30, preferably at the side thereof opposite that at which the lever 62 is positioned. The valve 91 will be mounted within convenient reach of an operator sitting upon the tractor seat 24 and will be provided with a hand lever 93 to facilitate manipulation of the valve.

The cylinder 81 and valve 91 constitute parts of a hydraulic system which is of the high pressure, high volume type. This system is best illustrated in Fig. 9. A high pressure, high volume pump 95 is connected with a power member, such as the engine of a tractor, to be driven thereby, as by means of a chain and sprocket drive 96. A line 97 connects the pump 95 to a relief valve 98. Line 97 preferably has interposed therein a check valve 104 and a mechanical pressure accumulator 105 of any construction found suitable. A line 99 connects the valve 98 to the control valve 91. A return line 100 leads from control valve 91 to an oil supply tank 101 which preferably is mounted upon the front portion of the frame forwardly of the tractor, as illustrated in Fig. 1. This arrangement of the parts enables the use of a liquid supply tank of large capacity so as to provide a sufficient capacity for the requirements of the device. A line 102 connects the relief valve 98 with the return line 100. A suction line 103 connects the tank 101 with the intake of the pump 95. The parts are so proportioned that the operating pressure of liquid in the system and the quantity of liquid in the system both are high to provide an instantaneous operating response at the cylinder unit 81 when the valve handle 93 is operated.

The arm 68 projects rearwardly from the shaft 62 to a position slightly forwardly of the driver's seat 24 upon the tractor so as to be in full view of the driver mounted upon the seat. The arm fixedly mounts a yoke at its rear or free end, which yoke includes a plate 110 positioned substantially perpendicular to the arm 68, a longitudinally outwardly projecting plate 111 and a second cross plate 112 spaced from and substantially parallel to the plate 110. Each of the plates 110, 111 and 112 will be substantially upright. The yoke defined by the parts 110, 111 and 112 receives the housing 113 of a gear head which is pivoted eccentrically at a laterally projecting portion 114 to the plates 110 and 112 upon shaft 115 substantially parallel to the arm 68. The lateral spacing of the pivot axis 115 from the axis of housing 113 serves to provide an unbalanced mounting of the gear head 113. Positioning means are utilized to control the attitude or tilt of the gear head, and these positioning means include arms 116 carried by or fixedly secured to the plates 110 and 112 projecting thereabove and having laterally projecting portions 117 positioned spaced above the gear housing 113 at opposite sides thereof and spaced from the pivot member 115. The members 117 have vertical screw-threaded bores therein which adjustably mount screw-threaded shafts 118. The shafts 118 project downwardly from the heads 117 and terminate spaced from the top surface of the gear housing 113.

A coil spring 119 encircles each of the shafts 118 and each bears at its lower end upon the top of the gear housing 113, and at its upper end upon a stud or nut 120 threaded upon a shaft 118. The plate 111 of the yoke fixedly mounts a substantially upright member 121 having a forwardly projecting arm 122 which has an aperture in its free end screw-threaded to receive a screw-threaded shaft 123 which projects downwardly and terminates in spaced relation above the top of the gear housing 113. A coil spring 124 encircles the shaft 123 bearing at its lower end against the top of the housing 113 and at its upper end against a stop (not shown) threaded upon the shaft 123. The springs 119 bear against the top of the gear housing 113 at one side of the pivot axis 115 of the gear head, and the spring 124 bears against the top of the gear housing 113 at the opposite side of the pivot axis 115. It will be apparent, therefore, that by adjusting the positions of the stops upon the shafts 118 and 123 the vertical position of the gear head 113 may be controlled at will within a predetermined range.

A shaft 130 is journaled in the gear housing 113 by an upper bearing member 131 and a lower bearing member 132. The shaft 130 projects below the housing 113 and mounts a tool unit which preferably includes a fixedly secured concentric plate 133. As here shown the plate 133 has a collar 134 and a screw or tapered pin 135 serves to connect the plate and the shaft. The plate has fixed thereto, as by means of bolts 136, the horizontal shank portions 137 of rigid depending tooth members 138 which constitute the ground-penetrating and working members. The members 138 will preferably be formed of heavy gauge spring steel plate comparable to the metal employed in the manufacture of automobile leaf springs. The members 138 will be arranged in spaced and equiangular relation upon the plate 133 with reference to that plate and to the shaft 130.

A driving connection is provided between the shaft 130 and the engine of the tractor. This drive connection is best illustrated in Figs. 7 and 8 from which it will be observed that the housing 113 confines the bevel gear 140 mounted on the shaft 130 and in turn meshing with a bevel pinion 141. The housing 113 preferably has a laterally projecting tubular portion 142 through which extends a stud shaft 143. Bearings 144 carried by the housing and extension 142 serve to journal the shaft 143 which mounts the pinion 141. At its outer end the shaft 143 mounts a yoke 145 which constitutes one part of a universal joint 146. A second part 147 of the universal joint 146 mounts an elongated rigid socket member 148 having an elongated axial bore 149 of non-circular cross-sectional shape. An elongated rigid shaft 150, preferably of a non-circular cross-section similar to the cross-sectional shape of the bore 149, fits slidably and non-rotatably within that bore, and at its outer end mounts a part 151 of a second universal joint 152. A yoke 153 forming another part of the universal joint 152 is mounted upon a countershaft 154 which is journaled in bearings 155 carried by a plate or hanger 156 adapted to be secured to the frame 22 of the tractor. The shaft 154 preferably mounts a sprocket 157 around which is trained a chain 158 in turn trained upon a sprocket 159 mounted upon the drive take-off shaft 160 carried by the tractor, which shaft 160 preferably will project from the transmission casing 25 of the tractor. The shaft 154 may also mount the sprocket 161 which serves to drive the chain 96 to the pump 95.

This device is particularly well suited and intended for movement along a path of travel as illustrated diagrammatically in Fig. 10 where the numeral 165 designates plants which are positioned in a straight row and spaced apart a substantial distance from one another. The rotary tool unit 133 is adapted to move between the plants along the straight runs 166 effectively cultivating a path of substantial width, including the area directly between the plants 165. The path of movement of the cultivating head 133 is offset at 167 around each plant as shown. It will be apparent, therefore, that as the device traverses along a given row at both sides, a complete cultivating action between the plants in the rows and around each individual plant will occur. By practice it has been found that with this device substantially all weeds around a plant can either be removed or can be covered with loose earth or mulch so as to be stunted in growth because of lack of air and sunlight. This operation is performed with the mechanism described by causing the device to travel substantially straight, alongside the row of plants to be cultivated, with its tilting head rotating and with its arm 68 swung in and out as required to permit the head to swing around and clear of the plants at the portions 167 of the path of movement shown in Fig. 10.

The lateral movement of the cultivator or tiller head 133 is controlled by the valve 91. This valve will normally be positioned inwardly so that the flow of oil or other liquid in the system will occur in the following circuit: From tank 101 through suction line 103 to pump 95, thence through high pressure line 97, relief valve 98, conduit 99, to control valve 91, and from control valve 91 through return line 100 to tank 101.

When the position of the valve 91 is changed by operating the lever 93, fluid in the system is diverted by the valve 91 from supply conduit 99 to one of the two conduits 90 and thence to the cylinder 81. At the same time the valve opens communication between the other conduit 90 and the return line 100 so that as the liquid under pressure enters one end of the cylinder 81, the liquid at the opposite end of that double-acting cylinder-piston unit may be discharged. By having a system of sufficiently high pressure and high volume, it is possible to secure substantially instantaneous response of the cylinder-piston unit 81 and to secure sufficient power so that the arm 81 may be moved laterally while the tractor is traveling forwardly, so that the tiller head 133 will follow the path indicated by the lines 166, 167.

The horizontal pivotal movement of the arm 68 occurs around the shaft or stud 67 as a center and is substantially devoid of friction by virtue of the fact that the weight of the arm at its intermediate portion is borne by the roller 74 which travels upon the cross angle 37 acting as a guide. The arm 68 is thus, in effect, a lever anchored to the tractor at its forward end and fulcrumed at its intermediate part so that its longitudinal tilt or attitude will depend upon the elevation of the part of the cross channel 37 which roller 74 engages. This longitudinal attitude can be varied by manipulating the hand lever 62' to alter the position of the cross channel 37, that is, to longitudinally tilt the cross channel 37 with respect to its intermediate fulcrum 40. It will be evident that the manipulation of the lever 62' will determine the vertical position of the tiller head between a position of maximum working depth and a position in which it is above and clear of the surface of the ground. Variations in the vertical position of the arm 68 and the cross channel 37 are accommodated by rotation of the shaft 62 relative to the bearings 60 by which it is journaled to the frame 30, 31 of the cultivator. It will also be evident that the device can be operated for the purpose of moving the arm in and out, as between the full line and the dotted line positions illustrated in Fig. 1, regardless of the longitudinal attitude or tilt of the arm 68, by virtue of the connections of the actuating cylinder and piston unit with the frame 30 and with the arm 68, respectively, said connections constituting substantially universal joints.

The tiller head can be power driven in all operative positions of the arm 68 and also at times when the tiller head 113 is elevated above and clear of the surface of the ground. In this connection attention is directed to the fact that the sliding interfit of the telescoping drive parts 149, 150 accommodates the driving connection as between opposite extremes of lateral movement of parts. In other words, the head may be rotated in all positions of lateral adjustment. The various positions of vertical adjustment are accommodated by the incorporation of the two universal joints 146, 152 in the driving connection between the power take-off and the tiller head. The same universal joints serve the additional function of transmitting driving forces in all of the various angles of adjustment of the axis of the shaft 130. Thus, in every operating condition of the device, the head is power driven and no binding action or interference with desired operation can occur.

The ability to tilt the working head to control its lateral position and to control its depth renders the device susceptible or adaptable to usage under all working conditions. The tilt adjustment of the rotating tiller head is of considerable importance in certain features of use. It is particularly important from the standpoint that it assists in throwing or displacing the dirt loosened by the tiller in a manner so as to build a ridge or hill, that is, in a manner to hill up around the plants 165. Thus, as viewed in Fig. 10, if the tiller head is rotating counter-clockwise and is so oriented that its operating shaft is tilted downwardly and inwardly with respect to the plant, then the operation of the tiller will be such that it tends to throw earth toward the plant and thus to build a hill around the plant and to build a ridge between the plants at the runs 166.

The device possesses substantial ability to yield in the event an obstacle, such as a sub-surface obstacle, is encountered. Observe in this connection that the action of the springs 48 and 54 permits substantial movement of the tiller head, the tiller mounting arm 68 and the positioning channel 37 relative to the mounting frame 30 and the tractor 20. In other words, if an obstacle is encountered, these springs permit the cross channel 37 to tilt as required to elevate the arm 68 and the tiller head to pass over that obstruction. It will also be noted that the springs 119 and 124 at the mounting of the frame of the tiller head 113 upon the arm 68 further serve to cushion any impact or blow due to the striking of an obstacle or obstruction. Thus the device possesses all of the resilience necessary for operative service under all operating conditions.

The device is not limited in its application and use to a toothed tiller head as shown. Any other type of ground-working tool, either rotary or non-rotary, may be used as desired. For example, a cultivator head having teeth or shovels may be carried by the free end of arm 68. Another alternative is to employ a rotary brush, that is, to mount one or more brushes with substantially vertical bristles upon the rotary plate 133. Such a brush is particularly well suited in fields in which small fruit is grown on bushy plants, such as blueberries and raspberries. The brush may be used to sweep away the fruit which falls to the ground beneath the bushes. The brush can also be used to remove small weeds without materially disturbing the soil.

While the drawings illustrate the preferred embodiment of the invention, it will be understood that they are intended to be illustrative and not limiting, and that all other constructions within the scope of the appended claims are contemplated to lie within the spirit of the invention.

We claim:

1. A cultivator comprising an elongated rigid arm, means for connecting said arm at its front end to a vehicle for lateral and vertical swinging movement relative to said vehicle, a tool carried by the free end of said arm, means for pivoting said arm laterally, a vertically tiltable lateral guide pivotally connected intermediate its ends to said vehicle, anti-friction means carried by one end portion of said arm and bearing upon one end portion of said guide, a resilient member applying downward pressure upon the opposite end portion of said guide, and an adjustment member carried by said vehicle for controlling the tilted position of said guide and including a rigid member and resilient member interposed between said rigid member and said guide.

2. A cultivator comprising an elongated rigid arm, means for connecting said arm at its front end to a vehicle for lateral and vertical swinging movement relative to said vehicle, a tool unit carried by the rear end of said arm, means for swinging said arm laterally, an elongated rigid transverse member pivoted to said vehicle on a longitudinal axis and underlying and supporting said arm, anti-friction means mounting said arm on said transverse member for permitting free longitudinal and vertical movement with respect thereto and means for positioning said transverse member at selected tilted vertical positions including resilient means yieldable to accommodate shifting of said transverse member under stress.

3. A cultivator comprising an elongated rigid arm, means for connecting said arm at its front end to a vehicle for lateral and vertical swinging movement relative to said vehicle, a tool unit carried by the rear end of said arm, means for swinging said arm laterally, an elongated rigid transverse member pivoted to said vehicle on a longitudinal axis and underlying and supporting said arm, anti-friction means mounting said arm on said transverse member for permitting free longitudinal and vertical movement with respect thereto, a vertical guide carried by said vehicle spaced from said axis for guiding pivotal movement of said transverse member, means for vertically moving said transverse member, said last named means having a lost motion connection with said transverse member, and a spring normally urging said transverse member in supporting position for said arm.

References Cited in the file of this patent

UNITED STATES PATENTS

| Number | Name | Date |
|---|---|---|
| 1,969,859 | Schrader | Aug. 14, 1934 |
| 2,055,632 | Petty et al. | Sept. 29, 1936 |
| 2,185,634 | Jacobs et al. | Jan. 2, 1940 |
| 2,206,283 | Jacobs et al. | July 2, 1940 |
| 2,253,130 | Lund | Aug. 19, 1941 |
| 2,437,581 | Wray | Mar. 9, 1948 |
| 2,442,198 | Dawley | May 25, 1948 |
| 2,489,633 | Fulgham | Nov. 29, 1949 |
| 2,494,271 | Turner et al. | Jan. 10, 1950 |
| 2,521,549 | Smith | Sept. 5, 1950 |
| 2,522,227 | Hostetter | Sept. 12, 1950 |
| 2,539,174 | Baideme et al. | Jan. 23, 1951 |